United States Patent
Lou et al.

(10) Patent No.: US 12,045,621 B2
(45) Date of Patent: Jul. 23, 2024

(54) METHOD FOR IMPROVING ACCURACY OF LOOP BRANCH PREDICTION

(71) Applicants: Jiangsu Huachuang Microsystem Company Limited, Nanjing (CN); Nanjing Research Institute of Electronics Technology, Nanjing (CN)

(72) Inventors: Jiong Lou, Nanjing (CN); Shiping Li, Nanjing (CN); Sibo Yang, Nanjing (CN); Ming Li, Nanjing (CN); Wenjun Han, Nanjing (CN); Zhiyong Lei, Nanjing (CN)

(73) Assignees: Jiangsu Huachuang Microsystem Company Limited, Nanjing (CN); Nanjing Research Institute of Electronics Technology, Nanjing (CN)

( * ) Notice: Subject to any disclaimer, the term of this patent is extended or adjusted under 35 U.S.C. 154(b) by 38 days.

(21) Appl. No.: 18/115,049

(22) Filed: Feb. 28, 2023

(65) Prior Publication Data
US 2023/0401068 A1  Dec. 14, 2023

(30) Foreign Application Priority Data
Jun. 10, 2022 (CN) .......................... 202210657136.4

(51) Int. Cl.
*G06F 9/30* (2018.01)
*G06F 9/32* (2018.01)
*G06F 9/38* (2018.01)

(52) U.S. Cl.
CPC ............ *G06F 9/3848* (2013.01); *G06F 9/325* (2013.01); *G06F 9/3826* (2013.01); *G06F 9/3844* (2013.01); *G06F 9/3869* (2013.01); *G06F 9/30065* (2013.01)

(58) Field of Classification Search
CPC ...... G06F 9/3848; G06F 9/325; G06F 9/3826; G06F 9/3844; G06F 9/3869; G06F 9/30065; G06F 9/3842; G06F 9/3867
See application file for complete search history.

(56) References Cited

U.S. PATENT DOCUMENTS

| | | | |
|---|---|---|---|
| 7,475,231 B2 * | 1/2009 | Tran | G06F 9/3806 712/E9.058 |
| 10,747,536 B2 * | 8/2020 | Grant | G06F 9/30065 |
| 11,875,155 B2 * | 1/2024 | Chirca | G06F 9/325 |
| 2005/0283593 A1 * | 12/2005 | Vasekin | G06F 9/3848 712/240 |
| 2023/0315476 A1 * | 10/2023 | Goudarzi | G06F 9/30065 712/239 |
| 2023/0401068 A1 * | 12/2023 | Lou | G06F 9/3844 |

* cited by examiner

*Primary Examiner* — Corey S Faherty
(74) *Attorney, Agent, or Firm* — Bayramoglu Law Offices LLC

(57) ABSTRACT

A method for improving an accuracy of a loop branch prediction algorithm by a bypass circuit, comprising: adding a bypass circuit to a loop branch prediction algorithm; and for three pcs entering a pipeline, enabling pc1 fetched in an if0 stage to enter a hybrid branch predictor, and registering pc1; obtaining branch prediction information in an if1 stage, and making a comparison in an if2 stage to obtain a prediction result, registering the prediction result obtained in the if2 stage, and processing pc2 and pc3 in a same way.

2 Claims, 2 Drawing Sheets

METHOD FOR IMPROVING ACCURACY OF LOOP BRANCH PREDICTION

CROSS REFERENCE TO THE RELATED APPLICATION

This application claims priority of Chinese application No. 202210657136.4, filed on Jun. 10, 2022, the entire content of which is incorporated herein by reference.

TECHNICAL FIELD

The invention relates to a method for improving the accuracy of a loop branch prediction algorithm by a bypass circuit, and belongs to the technical field of processor design.

BACKGROUND

In the design of modern superscalar processors, branch prediction has a great influence on the performance of the processors, and precision and speed are two major influential factors of the branch prediction performance. It is found, during research and development of some model of processors, that the direction of the last branch instruction of loop instructions is different from the previous direction, so a loop prediction algorithm is often used to predict whether such loop instructions jump or not, and it is difficult to predict the last branch instruction of a loop by other prediction algorithms. Although the loop prediction algorithm can realize high-precision prediction of the jump direction of the loop instructions, a branch predictor adopted for this algorithm is generally used as an auxiliary branch predictor, which has the problems of low prediction precision and speed in the scenario of multi-loop nesting. In order to improve the prediction precision and speed of the loop algorithm, the loop algorithm is improved by adding a bypass feedback circuit, so that the prediction precision and speed of the branch prediction algorithm are improved, thus improving the performance of processors.

The original basic principle of the loop algorithm is as follows:

| Count | Limit | DIR |
| --- | --- | --- |

A predictor comprises a counter, a cycle threshold and a prediction direction. The counter (count) indicates the state of a branch instruction of current loop control, the threshold (limit) indicates the loop count of a previous loop, and the prediction direction (DIR) indicates a direction opposite to the branch quit direction. When it is detected that a loop exits, limit is covered by count, and count is initialized to be 1. When count<limit, DIR is the branch prediction direction. When count=limit, the loop exits, and a direction opposite to DIR is used as a prediction result.

SUMMARY

The invention provides an implementation of a technique for improving the prediction precision and speed of the loop branch prediction algorithm by adding a bypass feedback circuit in the scenario of multi-loop nesting. A method for improving the accuracy of a loop branch prediction algorithm by a bypass circuit adopts the following technical solution:

The method for improving the accuracy of a loop branch prediction algorithm by a bypass circuit comprises: adding a bypass circuit to a loop branch prediction algorithm, and specifically comprises: for three PCs, pc1, pc2 and pc3, entering a pipeline, registering pc1, pc2 and corresponding branch prediction results of pc1 and pc2 by registers at a back end of the pipeline, and then bypassing the prediction results of pc1 and pc2 to an if1 stage of the pipeline by the bypass circuit; during circuit design, adding register circuits for pc1 and pc2 in an if3 stage and an if4 stage of the pipeline, and when pc1 and pc2 meet a hit condition of a loop predictor, registering values of pc1 and pc2 by registers in a subsequent pipeline stage, and bypassing the values of pc1 and pc2 to the if1 stage of the pipeline by the bypass circuit to be compared with a pc newly entering the pipeline through a comparison circuit; registering the prediction results of pc1 and pc2 in the registers in the subsequent pipeline stage through the register circuits in the if3 stage and the if4 stage, bypassing the prediction results of pc1 and pc2 to the if1 stage of the pipeline by the bypass circuit, and when it is determined, by the comparison circuit, that pc3 is equal to pc1 or pc2, using the corresponding branch prediction result of pc1 or pc2 in the if1 stage;

The method for improving the accuracy of a loop branch prediction algorithm by a bypass circuit specifically comprises:

When a first PC entering a hybrid branch predictor is fetched in an if0 stage, directly using the PC for addressing by the loop predictor of the hybrid branch predictor;

When pc1 meets the hit condition of the loop predictor, registering pc1 by a register; obtaining branch prediction information of pc1 in the if1 stage, making a comparison by the hybrid branch predictor in the if2 stage to obtain a prediction result, and registering the prediction result obtained in the if2 stage of the pipeline in pc1_loop_bypass_reg;

When pc2 is fetched in the next if0 stage, entering the if1 stage to compare the value of pc2 with the value of pc1; when pc2 is equal to pc1, reusing the prediction result and hit information (value in pc1_loop_bypass_reg) of the first PC through the bypass circuit; otherwise, if pc2 meets the hit condition of the loop predictor, registering pc2 and the corresponding prediction result in pc2 loop_bypass_reg; and Similarly, when pc3 enters the if1 stage, comparing pc3 with the PC values registered in pc1_loop_bypass_reg and pc2 loop_bypass_reg; if pc3 is equal to pc1, bypassing, by the bypass circuit, the prediction result pc1_bypass_reg to if1 to be used; if pc3 is equal to pc2, bypassing, by the bypass circuit, the prediction result pc2_bypass_reg to if1 to be used; if pc2 is neither equal to pc1 nor equal to pc2 and meets the hit condition of the loop prediction, covering the prediction result pc1_bypass_reg with the prediction result pc2_bypass_reg, and registering a prediction result of the third PC in pc2 loop_bypass_reg.

Preferably, if a fourth PC meets the hit condition of the loop prediction, the process is repeated, and in this case, pc4, pc3 and pc2 replace pc3, pc2 and pc1 to form a new ternary group; and pc2, pc3 and prediction results pc2_bypass_reg and pc3_bypass_reg are cyclically registered for subsequent prediction of pc4.

The loop prediction algorithm involved in the method provided by the invention belongs to the prior art, and is known by those skilled in the art. The bypass circuit involved in the method provided by the invention belongs to the prior art, and is known by those skilled in the art.

Compared with the prior art, the invention has the following beneficial effects:

According to the method provided by the invention, because the loop predictor is suitable for predicting loop instructions and the probability of repeated occurrence of PCs is high, the solution improves the loop instruction prediction accuracy of the loop algorithm, reduces operations such as table look-up, and reduces power for implementing the algorithm.

According to the method provided by the invention, the bypass feedback mechanism can monitor subsequent PCs, and once a value equal to the values of two previously registered PCs appears, the prediction results of the previous PCs will be used, so that the precision and speed of branch prediction are improved.

DETAILED DESCRIPTION OF THE EMBODIMENTS

To gain a better understanding of the contents of the invention, the invention will be further described below in conjunction with FIG. 1-FIG. 2 and specific implementations.

Figure 1:
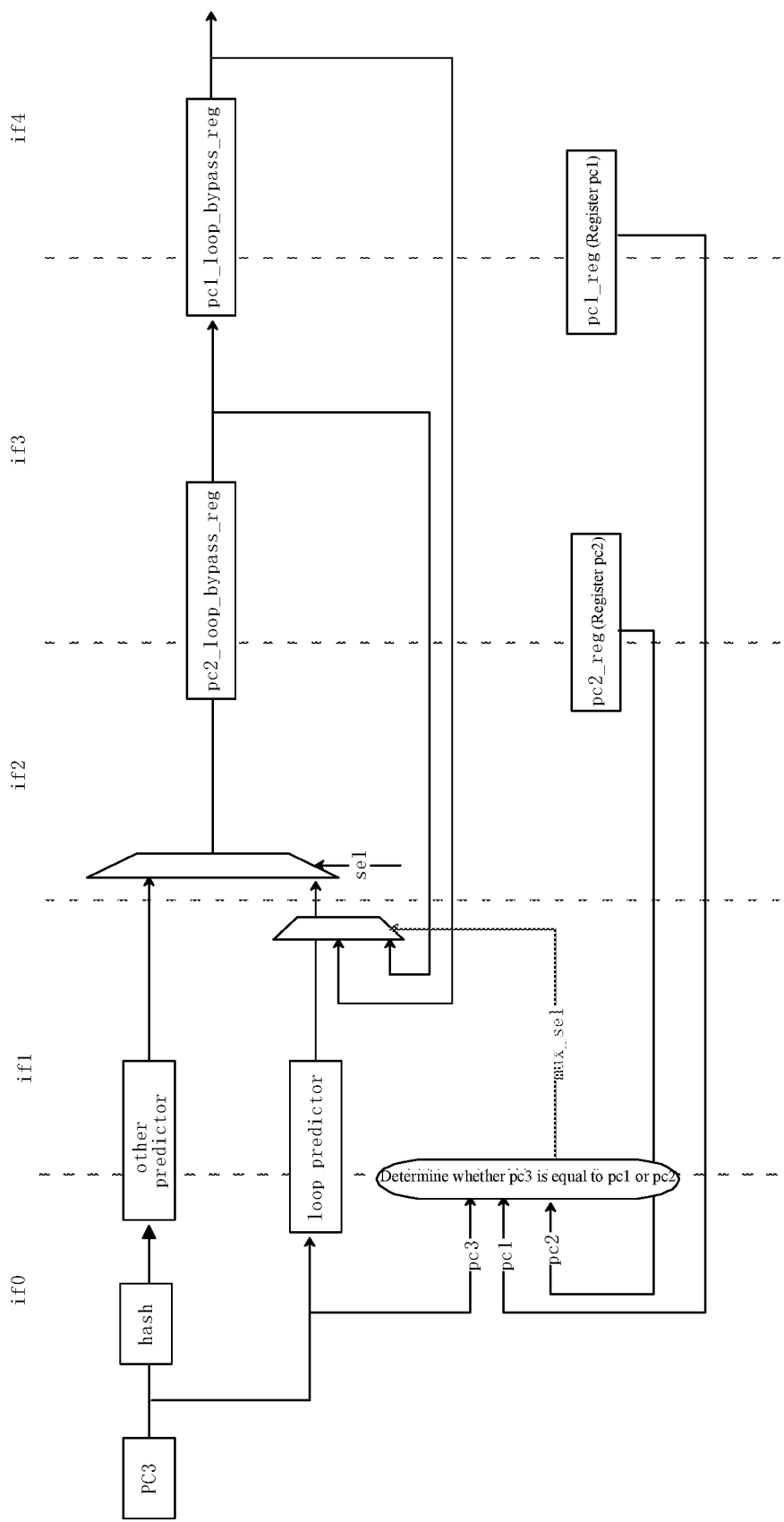
FIG. 1 is a flow block diagram of a method provided by the invention.

Three adjacent PCs (pc1, pc2 and pc3) entering a pipeline are shown in FIG. 1, wherein pc1 and pc2 have entered the pipeline, and pc3 is entering the pipeline.

The invention provides a method for improving the accuracy of a loop branch prediction algorithm by a bypass circuit, which comprises: as for three PCs, pc1, pc2 and pc3, entering a pipeline, pc1, pc2, and corresponding branch prediction results of pc1 and pc2 are registered by registers at a back end of the pipeline, and are then bypassed to an if1 stage of the pipeline by a bypass circuit; during circuit design, register circuits for pc1 and pc2 are added in an if3 stage and if4 stage of the pipeline, and when pc1 and pc2 meet a hit condition of a loop predictor, values of pc1 and pc2 are registered in registers in a subsequent pipeline stage and are bypassed to the if1 stage of the pipeline by the bypass circuit to be compared with a pc newly entering the pipeline through a comparison circuit; the prediction results of pc1 and pc2 are registered in the registers in the subsequent pipeline stage through the register circuits in the if4 stage and the if3 stage, and are bypasses to the if1 stage of the pipeline by the bypass circuit, and when it is determined, by the comparison circuit, that pc3 is equal to pc1 or pc2, the corresponding branch prediction result of pc1 or pc2 in the if1 stage is used;

The method for improving the accuracy of a loop branch prediction algorithm by a bypass circuit specifically comprises:

When a first PC entering a hybrid branch predictor is fetched in an if0 stage, the loop predictor of the hybrid branch predictor directly uses the PC for addressing;

When pc1 meets the hit condition of the loop predictor, pc1 is registered by a register; branch prediction information is obtained in the if1 stage, a comparison is made by the hybrid branch predictor in the if2 stage to obtain a prediction result, and the prediction result obtained in the if2 stage of the pipeline is registered in pc1_loop_bypass_reg;

When pc2 is fetched in the next if0 stage, pc2 enters the if1 stage, and the value of pc2 is compared with the value of pc1; when pc2 is equal to pc1, the prediction result and hit information (value in pc1_loop_bypass_reg) of the first PC are reused by the bypass circuit; otherwise, if pc2 meets the hit condition of the loop predictor, pc2 and the corresponding prediction result are registered in pc2 loop_bypass_reg;

Similarly, when pc3 enters the if1 stage, pc3 is compared with the PC values registered in pc1_loop_bypass_reg and pc2 loop_bypass_reg; if pc3 is equal to pc1, the prediction result pc1_bypass_reg is bypassed by the bypass circuit to if1 to be used; if pc3 is equal to pc2, the prediction result pc2_bypass_reg is bypassed by the bypass circuit to if1 to be used; if pc2 is neither equal to pc1 nor equal to pc2 and meets the hit condition of the loop prediction, the prediction result pc1_bypass_reg is covered with the prediction result pc2_bypass_reg, and a prediction result of the third PC is registered in pc2 loop_bypass_reg.

If a fourth PC meets the hit condition of the loop prediction, the process is repeated, and in this case, pc4, pc3 and pc2 replace pc3, pc2 and pc1 to form a new ternary group; and pc2, pc3 and prediction results pc2_bypass_reg and pc3_bypass_reg are cyclically registered for subsequent prediction of pc4.

According to the method provided by the invention, because the loop predictor is suitable for predicting loop instructions and the probability of repeated occurrence of PCs is high, the solution improves the loop instruction prediction accuracy of the loop algorithm, reduces operations such as table look-up, and reduces power for implementing the algorithm. The bypass feedback mechanism can monitor subsequent PCs, and once a value equal to the values of two previously registered PCs appears, the prediction results of the previous PCs will be used, so that the precision and speed of branch prediction are improved.

Figure 2:
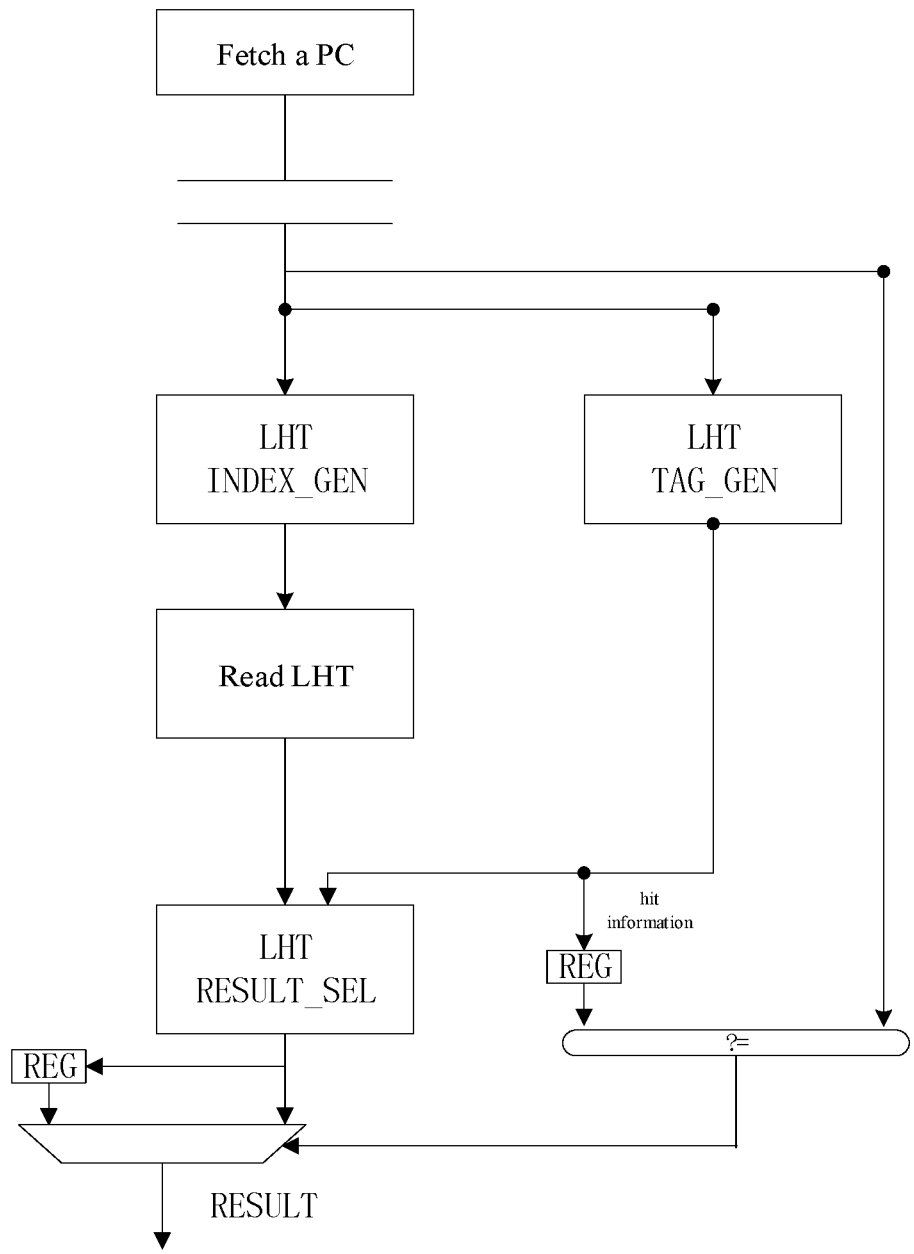
FIG. 2 is a flow diagram of a loop prediction algorithm in one embodiment.

As shown in FIG. 2, the loop branch prediction algorithm adopting the bypass circuit in this embodiment comprises the following steps:

S1: a PC is fetched, indexes and part of tags of a loop history table (LHT) are generated, and the PC is compared with pc1 and pc2 bypassed by the bypass circuit; if the PC is neither equal to pc1 nor equal to pc2, S2 is performed; if the PC is equal to either pc1 or pc2, S4 is performed;

S2: when the PC is neither equal to pc1 nor equal to pc2, a prediction item and prediction information of the LHT are searched out in the next stage of the pipeline of the PC through the indexes, and then S3 is performed;

S3: whether the LHT is hit is determined according to part of the tags and the read prediction item; if the LHT is hit, a final prediction result is obtained according to hit information and an arbitration of the hybrid predictor, and the PC and the final prediction result are registered by a register; if the LHT is not hit, relevant information is not registered;

S4: if the PC is equal to pc1 in Step 1, the prediction result of pc1 bypassed to if1 is used as a final result; or, if the PC is equal to pc2 in Step S1, the prediction result of pc2 bypassed to if1 is used as a final result.

In this embodiment, the LHT is generated, and each item in the LHT comprises a 10 bit counter count, a 10 bit loop upper limit, a 10 bit tag, a 3 bit confidence, a 3 bit age, and a 1 bit dir. Count is used to record the loop count of a current loop, limit indicates the total loop count of a previous loop, tag is used to indicate whether the LHT is hit, confidence is used to determine whether learning of the loop predictor is stable, age is used for replacement of the LHT, and dit indicates a direction opposite to the loop exit direction. The loop predictor mainly predicts regular loop conditional branches and stores history information in count and limit, so past records are not needed, and INDEX and TAG are generated by directly performing an XOR operation on part of fields of the PC.

LHT RESULT_SEL: whether the LHT is hit is determined by comparing the generated index and tag with read items of the LHT, and all contents of hit items are output. Whether a prediction result of a main predictor is replaced with the result of the loop predictor is determined according to whether confidence has a maximum value.

As shown in FIG. 2, relevant conditions of loop prediction results and hit during prediction are added in the flow diagram of the loop algorithm and are registered in registers in the subsequent pipeline, and previous prediction results can be used in case of the same pc value, so power consumption is reduced when the prediction algorithm is implemented again; and the registered prediction results are corrected results, and prediction errors are avoided, so that the accuracy of prediction results is improved.

According to the method in this embodiment, based on the characteristic that the loop predictor mainly predicts loop instructions and the probability of repeated occurrence of PCs is high, indexes meeting the hit condition of the loop predictor and corresponding final prediction results are registered and are bypassed to the if1 stage of the pipeline by the bypass circuit, so that the probability of incorrect prediction results in case of the same PC is decreased, the accuracy of branch prediction of processors is improved, and the problem of performance reduction of the processors caused by high error rate of branch prediction is solved.

Those not involved in the invention are identical with the prior art, or can be realized by the prior art.

What is claimed is:

1. A method for improving an accuracy of a loop branch prediction algorithm by a bypass circuit, comprising: adding the bypass circuit to the loop branch prediction algorithm, wherein for three PCs, pc1, pc2 and pc3 entering a pipeline, registering pc1, pc2, and corresponding branch prediction results of pc1 and pc2 by registers at a back end of the pipeline, and then bypassing the prediction results of pc1 and pc2 to an if1 stage of the pipeline by the bypass circuit; during circuit design, adding register circuits for pc1 and pc2 in an if3 stage and an if4 stage of the pipeline, and when pc1 and pc2 meet a hit condition of a loop predictor, registering values of pc1 and pc2 by registers in a subsequent pipeline stage, and bypassing the values of pc1 and pc2 to the if1 stage of the pipeline by the bypass circuit to be compared with a pc newly entering the pipeline through a comparison circuit; registering the prediction results of pc1 and pc2 in the registers in the subsequent pipeline stage through the register circuits in the if3 stage and the if4 stage, bypassing the prediction results of pc1 and pc2 to the if1 stage of the pipeline by the bypass circuit, and when it is determined, by the comparison circuit, that pc3 is equal to pc1 or pc2, using the corresponding branch prediction result of pc1 or pc2 in the if1 stage;

when a first PC entering a hybrid branch predictor is fetched in an if0 stage, directly using the PC for addressing by the loop predictor of the hybrid branch predictor;

when pc1 meets the hit condition of the loop predictor, registering pc1 by a register; obtaining branch prediction information of pc1 in the if1 stage, making a comparison by the hybrid branch predictor in the if2 stage to obtain a prediction result, and registering the prediction result obtained in the if2 stage of the pipeline in pc1_loop_bypass_reg;

when pc2 is fetched in the next if0 stage, entering the if1 stage to compare the value of pc2 with the value of pc1; when pc2 is equal to pc1, reusing the prediction result and hit information, including a value in pc1_loop_bypass_reg, of the first PC through the bypass circuit; otherwise, if pc2 meets the hit condition of the loop predictor, registering pc2 and the corresponding prediction result in pc2_loop_bypass_reg; and similarly, when pc3 enters the if1 stage, comparing pc3 with the PC values registered in pc1_loop_bypass_reg and pc2_loop_bypass_reg; if pc3 is equal to pc1, bypassing, by the bypass circuit, the prediction result pc1_bypass_reg to if1 to be used; if pc3 is equal to pc2, bypassing, by the bypass circuit, the prediction result pc2_bypass_reg to if1 to be used; if pc2 is neither equal to pc1 nor equal to pc2 and meets the hit condition of the loop prediction, covering the prediction result pc1_bypass_reg with the prediction result pc2_bypass_reg, and registering a prediction result of the third PC in pc2_loop_bypass_reg.

2. The method for improving the accuracy of the loop branch prediction algorithm by the bypass circuit according to claim 1, wherein if a fourth PC meets the hit condition of the loop prediction, the process is repeated, and in this case, pc4, pc3 and, pc2 replace pc3, pc2, and pc1 to form a new ternary group; and pc2, pc3, and prediction results pc2_bypass_reg and pc3_bypass_reg are cyclically registered for subsequent prediction of pc4.

* * * * *